United States Patent [19]
Sol

[11] Patent Number: 5,315,287
[45] Date of Patent: May 24, 1994

[54] ENERGY MONITORING SYSTEM FOR RECREATIONAL VEHICLES AND MARINE VESSELS

[76] Inventor: David Sol, 26500 W. Agoura Rd., Ste. 383, Calabasas, Calif. 91302

[21] Appl. No.: 3,576

[22] Filed: Jan. 13, 1993

[51] Int. Cl.5 .................................................. B60Q 1/00
[52] U.S. Cl. ...................... 340/455; 340/636; 340/663; 324/428; 324/430; 320/32; 320/39
[58] Field of Search ........... 340/636, 663, 455; 324/428, 426, 427, 430, 436; 320/32, 21, 39, 48, 20

[56] References Cited
U.S. PATENT DOCUMENTS

| | | | |
|---|---|---|---|
| 4,012,681 | 3/1977 | Finger et al. | 324/428 |
| 4,625,175 | 11/1986 | Smith | 324/430 |
| 4,678,999 | 7/1987 | Schneider | 324/427 |
| 4,719,427 | 1/1988 | Morishita et al. | 324/426 |
| 4,849,700 | 7/1989 | Morioka et al. | 324/426 |
| 4,929,931 | 5/1990 | McCuen | 324/426 |
| 4,947,123 | 8/1990 | Minezawa | 340/636 |
| 4,949,046 | 8/1990 | Seyfang | 340/636 |
| 4,952,862 | 8/1990 | Biagetti et al. | 320/43 |
| 4,958,127 | 9/1990 | Williams et al. | 324/426 |
| 5,032,825 | 7/1991 | Kuznicki | 340/636 |
| 5,126,675 | 6/1992 | Yang | 324/435 |
| 5,151,865 | 9/1992 | Blessing et al. | 324/427 |

*Primary Examiner*—John K. Peng
*Assistant Examiner*—Nina Tong

[57] ABSTRACT

The invention continuously monitors the current drawn from the on board battery system of a recreational vehicle or marine vessel. The device calculates and displays the energy remaining as a portion of the total capacity by accumulating over time the net energy drawn out of the battery. The device accurately accounts for the known effect of effectively lower battery capacities at higher current draws, and also allows the user to re-initialize the battery system capacity to reflect either degradation of the battery capacity with time or upgrades to the battery system.

9 Claims, 4 Drawing Sheets

ENERGY MONITORING SYSTEM FOR RECREATIONAL VEHICLES AND MARINE VESSELS

BACKGROUND OF THE INVENTION

I. Field of the Invention

The present invention relates generally to a device for use in mobile recreational vehicles, marine vessels, and other such mobile self-contained living environments. The device monitors and computes the stored energy in the battery systems of such vehicles or vessels.

II. Description of the Prior Art

Self contained Recreational Vehicles (RV's) and marine vessels and the like typically contain on board battery systems, typically 12 volts DC to provide electricity to the living environments or cabins of such vehicles. The battery system consists of one or more batteries wired together in parallel and is normally electrically isolated from the vehicle prime mover battery which provides electrical power to start and run the engine or vehicle propulsion. In this manner, operation of the lights and appliances in the cabin will not discharge the prime mover battery. The cabin battery system is typically recharged by one of three different methods:

Typically when the prime mover battery is being charged, such as from an alternator being driven by an internal combustion engine, the two distinct battery systems are then connected together to permit charging the cabin battery system while the vehicle engine is running.

Another typical source of charging current to the battery is a solar panel, normally mounted on the roof of the RV. The solar panel generally consists of arrays of photo voltaic cells that convert sunlight into electricity and can therefore provide varying degrees of recharging current under varied weather conditions.

Yet another source of recharging current to the cabin battery systems are AC to DC converters which convert externally supplied 120 volt AC current when available from an RV park or dockside to the 12 volt DC level of the battery and regulate the charging rate. Commercially available units are very common which provide not only the electrical conversion and charging, but also provide current distribution and safety features. Terminals protected by circuit breakers are typically provided to which 120 volt appliances can be connected. Also typical is a distribution panel of several fused circuits to which the various 12 volt appliances can be connected.

As is known in the art, cabin battery systems for RV and marine use have different uses and requirements than the engine or starting batteries of vehicle propulsion systems. The engine battery is normally designed to provide a relatively large amount of current over a short time to drive a starter motor and start the engine. Although this requires large current flow, after the engine is running the battery is normally not required to provide more energy since electrical power is available from the engine alternator for vehicle loads such as headlights and the like and also for immediately recharging the battery itself. RV batteries, on the other hand, are normally required to provide relatively small to moderate current flow to operate the on board appliances such as 12 volt lights, water pump, heating furnace, and so on. Although the current demands are not large, they must be provided over very long periods of time, for example the many hours of a weekend or week-long camping trip. The Rv battery systems then are typically drained much closer to total discharge, then recharged by some combination of the charging methods previously discussed. These batteries are designed for much longer and frequent discharging-charging cycles than a vehicle starting battery and are referred to in the art as deep cycle batteries.

As is known in the art, at any point in time it is difficult to know how much energy remains in the battery system. The stored energy in the battery can be depleted slowly in powering such devices as lights, idle standby current draws of appliances like gas furnaces and water heaters, or small venting fans which draw little current. Although the current drawn is very small, typically a fraction of an ampere per device, the current drain is constant and when accumulated over time the energy depletion becomes appreciable. Conversely, appliances such as demand water pumps, heating furnaces or an inverter powering a microwave oven draw relatively large currents when active, typically 5 to 10 amperes per device. As is known, although the current drawn is large, the appliance use is of an intermittent nature as opposed to the constant but small current drains discussed. It is extremely difficult to ascertain at any point in time how much energy has been depleted due to the fact that a mixture of such slow and rapid depletion occurs, depending on which appliances are used for what intervals of time. Even if all durations of use for each appliance was monitored, the current drawn by each would need to be known, and in the prior art current indication is not often provided. Even if it were, the instantaneous current drawn is not a measure of the past history of energy depletion. In the prior art, commercially available panels are typically installed in Rv's which provide indication of the levels of fresh water supply and waste fluids in various tanks, as well as providing an indication for the battery. Unfortunately this indication is typically only that of battery voltage and is indicated at a poor resolution: empty, one-fourth, one-half, three-fourths, and full, sharing with the tanks this typically used array of 5 such labeled indicating lamps or LED's. Further, the battery voltage level measured and shown is instantaneous and therefore has no information regarding the energy depletion in past history, whether of an intermittent or constant nature or some combination of both.

Numerous examples in the prior art exist for estimating the state of charge of a battery, a notable example being a simple commercially device known as a hydrometer which with manual operation measures the specific gravity of the electrolytic fluid in a wet battery.

Regarding energy as opposed to state of charge, there is a deficiency in the art regarding measuring the actual energy used or depleted from the battery system over a given interval of time. In the field of battery systems of Rv's and the like, the given interval of concern might be that since a full overnight recharge. The energy depleted from the RV battery system is a function of the total power drawn by each appliance accumulated or integrated over the interval of time. There is a deficiency in the art since the instantaneous measurements of either current or voltage by their nature do not accumulate or integrate power draws over these intervals.

U.S. Pat. No. 4,958,127 of Williams et al derives the state of charge of a battery by measuring terminal voltage after application of a stabilization load. Like all other similar instantaneous state of charge devices, past history of energy drawn and energy capacities are neither monitored nor addressed.

U.S. Pat. No. 4,625,175 of Smith is an example in the prior art of such a device which measures the instantaneous open circuit voltage. Smith attempts to infer how much time remains in the life of the battery by providing a voltmeter with a scale from 11.7 to 12.7 volts and labeling the scale in increments of time. It is known that voltage potential expressed in volts and energy expressed in ampere-hours are fundamentally not equivalent. Therefore the assigned and labeled upper and lower limits, in addition to being arbitrary cannot be correlated to stored energy. U.S. Pat. No. 4,952,862 of Biagetti similarly attempts to predict the available reserve time remaining to a lower limit end voltage. Further, the time remaining from any point forward could not be known unless the current drawn from the battery was known ahead of time, such as a known constant. This is not the case in deep cycle RV batteries and the like since different appliances which have very different current demands are run in an intermittent manner.

The net energy remaining in an RV battery system at a point in time is due not only to the energy depleted from it since it was fully recharged, but also due to any partial charging which may have occurred during that time by any combination of the three charging methods described previously. For example, partial charging during sunlight by solar panels, and/or charging by the vehicle alternator during various travel segments, and/or partial night's stay at an RV park hookup for rest all may provide variable charge currents during a trip.

U.S. Pat. No. 5,032,825 of Kuznicki measures the battery voltage at two different current discharge rates and from the resultant differential attempts to infer the battery capacity. U.S. Pat. No. 4,849,700 of Moriok a attempts to detect low residual capacity of a battery by measuring battery voltage, and converting other instantaneous measurements into a conversion voltage value. These and many similar devices do not provide for the existence of any charging currents as would be present in a deep cycle or RV battery system. Further, as previously discussed, the voltage potential expressed in volts and energy capacity expressed in ampere-hours are fundamentally not equivalent and so the inference cannot be accurate.

Many other similarly questionable inferences and correlations exist in the prior art. U.S. Pat. No. 5,126,675 of Yang, for example, indirectly determines the equivalent internal resistance and attempts to correlate it to the remaining battery capacity. The resistance expressed in ohms and energy capacity expressed in ampere-hours are fundamentally not equivalent and so the inference cannot be accurate. Although simple and inexpensive in nature, and possibly correlatable in very special circumstances they cannot be accurate in the demanding applications inherent in the general operation of deep cycle batteries without knowledge of the past history.

It is known in the art that the deep cycle batteries utilized in Rv's and the like have effectively lower energy capacity at higher current draws. For example, a battery rated at 100 amp hours will be able to provide 5 amperes of current for 20 hours, but may only supply 10 amperes for 8 hours for a total of 80 amp-hours. Commercially available batteries in the recent art for this reason often carry ratings at two different current draws (e.g., in the present example 100 amp-hours at 5 amps and 80 amp-hours at 10 amps). This effective decrease in battery capacity means that to determine the energy remaining after some depletion a simple integration of current alone over time is not accurate. In particular, the owner or operator of an RV or the like could find the battery system dead while such a device inaccurately indicates some remaining stored energy. U.S. Pat. Nos. 4,051,424 of Privee and 4,678,999 of Schneider are examples of such integrating devices providing a digital amp-hour monitor. U.S. Pat. No. 4,740,754 of Finger and U.S Pat. No. 3,971,980 of Jungfer et al are examples of many other such devices incorporating similar integrating schemes.

A further deficiency in the prior art is apparent when also considering that the net energy level remaining in an RV battery system at any point in time is due not only to both the energy depleted and the energy restored due to recharging during some interval of time, but also the total energy that was present at the start of that time interval. Thus if the time interval is considered to be the time since a full recharge, the total initial energy is the battery capacity. However, as is known in the art, this energy capacity, typically advertised for a given battery in amp-hours, cannot accurately assumed to be constant since it decreases with time due to degradation of the battery itself. Further, the capacity of a given Rv battery system may also increase due to replacement of one or more batteries or augmentation with more batteries. Further, the actual capacity achieved by a battery in warm weather use may be different than that in cold weather. Therefore variations in capacity can occur due to seasons. Further, changes in regional climate from traveling can occur even during a given trip in an Rv: for example traveling in the Rv from desert to mountain regions or northern to southern regions.

It is apparent that there is a need in the art for a system which provides accurate information to the operator of an RV or marine vessel as to how much stored energy presently exists in the battery system.

SUMMARY OF THE INVENTION

The present invention meets this need by providing instrumentation, computational and indication functions for the battery system of an RV or marine vessel or the like. The device continuously monitors the current drawn by loads from the battery system, and/or the recharging current supplied to it. The device accumulates over time and computes the net energy depleted from the battery, incorporating in the computation the known effect of effectively reduced capacities at higher current draws. The total net energy remaining is computed and displayed as a percentage or portion of the total original battery energy capacity. The device provides for user reset of the accumulation and computation functions and for changing the total battery system capacity to reflect degradation or upgrades to the batteries.

BRIEF DESCRIPTION OF THE DRAWINGS

FIG. 1 is a top-level functional diagram showing the invention connected to the typical electrical power components of a recreational vehicle or the like.

DESCRIPTION OF THE PREFERRED EMBODIMENT

Figure 1:
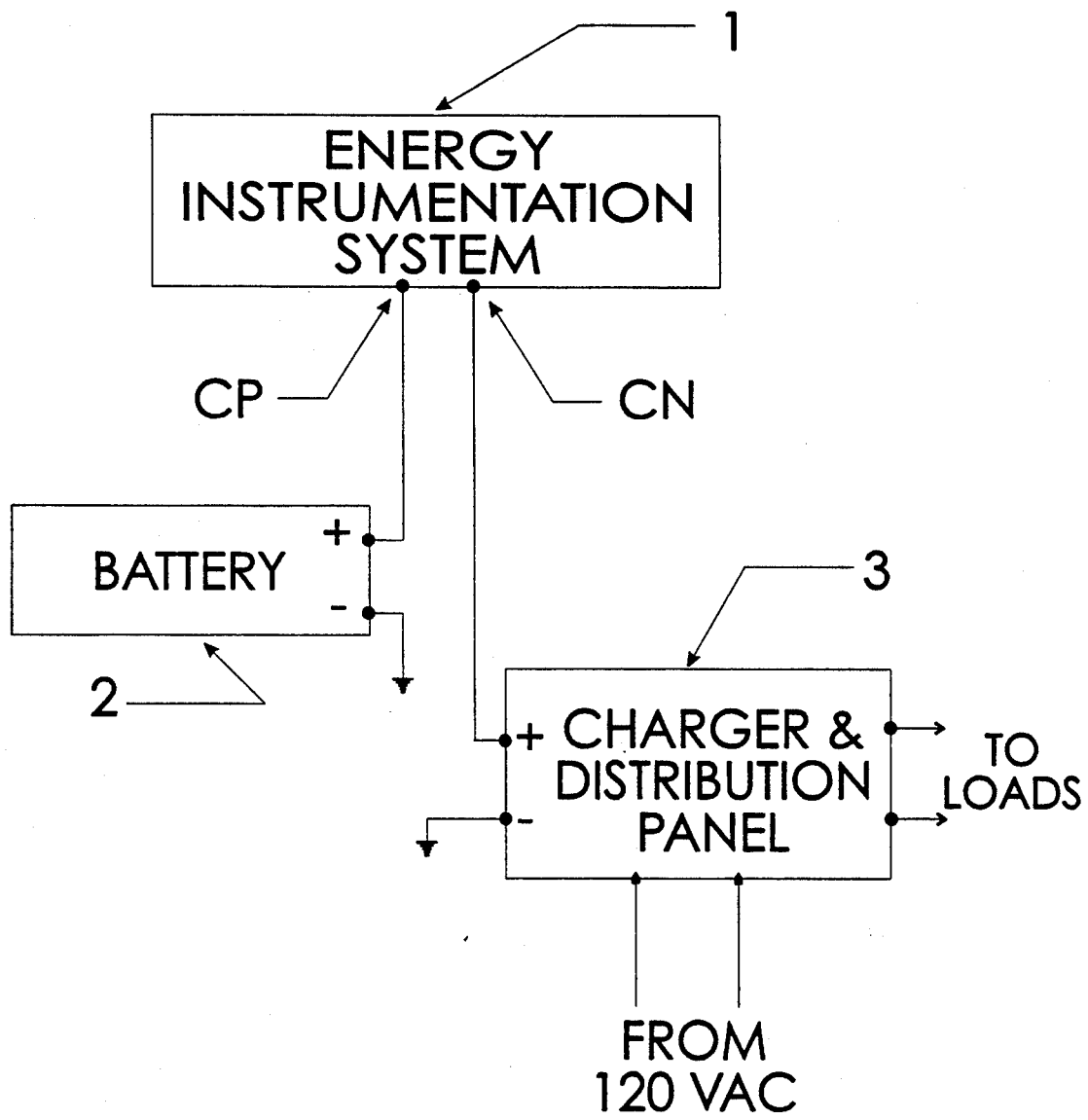

Referring first to FIG. 1, the preferred embodiment of the invention is shown electrically connected to the typical electrical power components of a recreational vehicle or marine vessel or the like. The various charging means used in the art are not central to the invention described herein, nor is the load distribution circuitry. The Charger & Distribution Panel 3 in the figure has a set of electrical contacts labeled 'FROM 120 VAC' which indicate the interface to external hook-up or dock power, and a set of contacts labeled 'TO LOADS' which indicate the interfaces to internal vehicle loads and appliances. The negative terminal of the charger & distribution panel 3 is connected to ground in the preferred embodiment, as is common in the art. The negative terminal of the RV cabin Battery 2 is also connected to ground. Normally, the positive terminal of battery 2 would be connected to the positive terminal of the charger & distribution panel 3 facilitating current flow from the battery to the charger & distribution panel when appliances or loads are drawing power, and conversely, current flow from the charger and distribution panel to the battery when recharging. In the preferred embodiment, the invention, the Energy Instrumentation System 1 is connected in series between the battery and the charger & distribution panel: the positive terminal of battery 2 is connected to the electrical terminal CP of the Energy Instrumentation system, and the electrical terminal CN of the Energy Instrumentation System is connected to the positive terminal of the charger & distribution panel 3. In this manner, current drawn out of the battery by the loads flow through the invention from electrical terminal CP to electrical terminal CN, and conversely current flowing into the battery from recharging flows from electrical terminal CN to electrical terminal CP.

Figure 2:
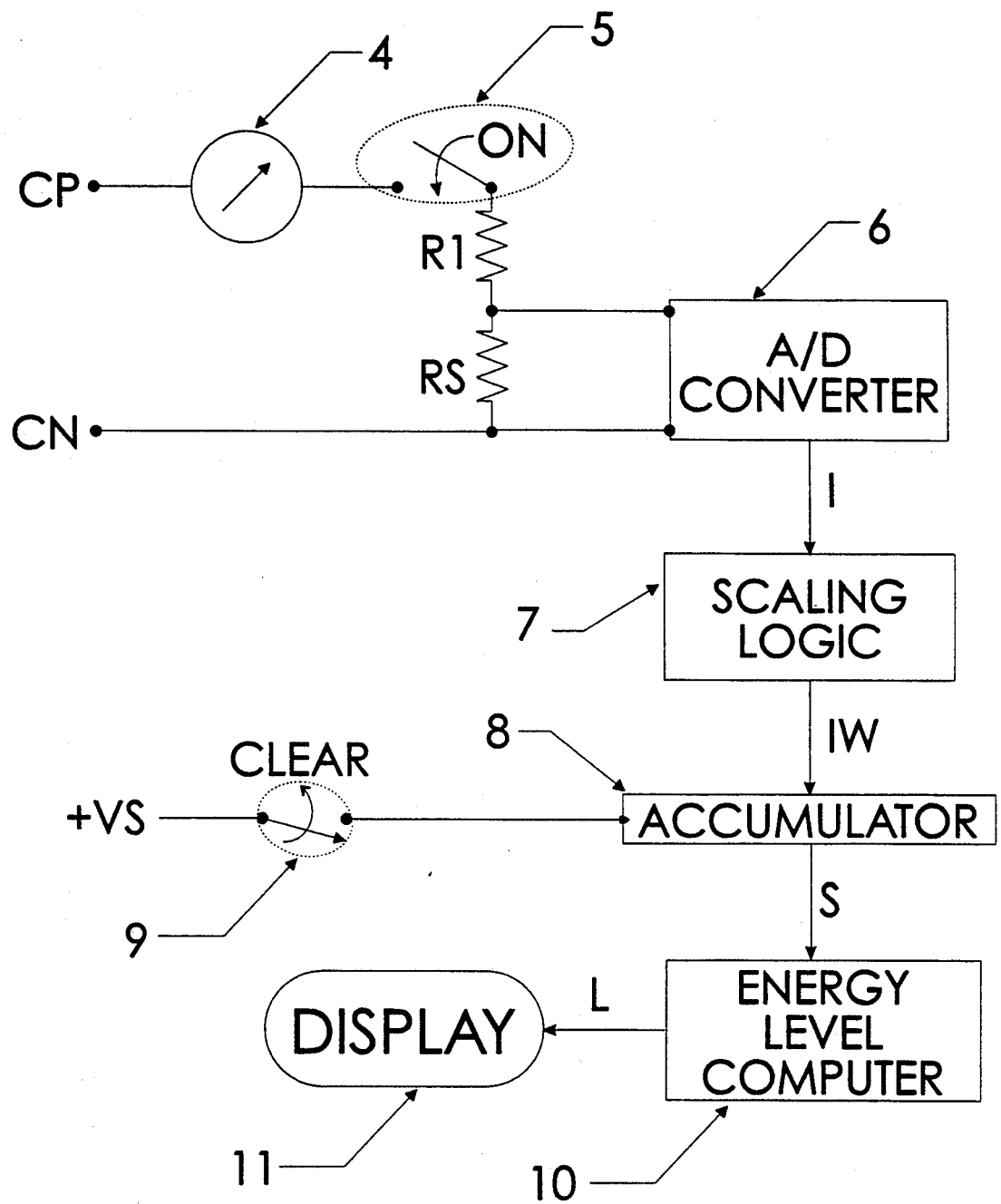
FIG. 2 is a block diagram of the invention shown in FIG. 1.

Referring now to FIG. 2, the general features of the invention will be described. In the preferred embodiment, the electrical terminals CP and CN in FIG. 2 represent the same input and output terminals for current flow as previously described in FIG. 1. Assuming current is being drawn out of the battery by the loads, current flows into terminal CP in the figure and through an ammeter 4 which provides instantaneous indication of current flow. Said ammeter is preferably located at a central instrumentation and control panel of the device located in the cabin interior of the recreational vehicle (RV) or vessel. Switch 5, when closed, allows current to flow across resistors R1 and sense resistor RS. The voltage drop sensed across sense resistor RS is proportional to the current being drawn by the battery, such proportion being determined by the voltage divider ratio RS/(R1+RS). An analog to digital (A/D) converter 6 converts the sensed voltage drop across the sense resistor RS and converts it to a digital signal I. The magnitude of the binary representation of I is therefore directly proportional to the amount of current being drawn out of the battery, such proportion being determined by the resistive voltage divider network above and the scaling and resolution of the A/D converter. The digital signal I is input to the scaling logic 7 which computes an an effectively weighted signal IW, accounting for the known effect of reduced capacities in the computation, the details of which will be described later. The digital weighted current signal IW is then input to an accumulator 8 which integrates or sums over time the current signal IW to compute the accumulated energy sum signal S. Said energy sum may be reset to zero by the closure of normally open momentary switch 9, preferably by a momentary switch located on the central panel. In the preferred embodiment of the invention, one end of said switch is connected to logical power supply voltage +Vs and the other to the clear line of the accumulator such that when said clear line is energized, the internal buffer contents of the accumulator are cleared or reset to zero. Other means of accomplishing these functions are possible. For example, in another embodiment of the invention, an analog signal responsive to current flow can be input to an operational amplifier configured with a feedback capacitor. As is known in the art, the output of such a configuration is a signal which integrates the input. The clearing operation can be accomplished by a reset or discharge of said configuration. These and other possible variations implementing the functionality described herein are properly considered to be within the scope and spirit of the claims to be presented. Returning to FIG. 2, the energy sum signal S is then applied to the Energy Level Computer 10 which computes the remaining energy level in the battery, the details of which will be described later, and outputs it to display 11.

Figure 3:
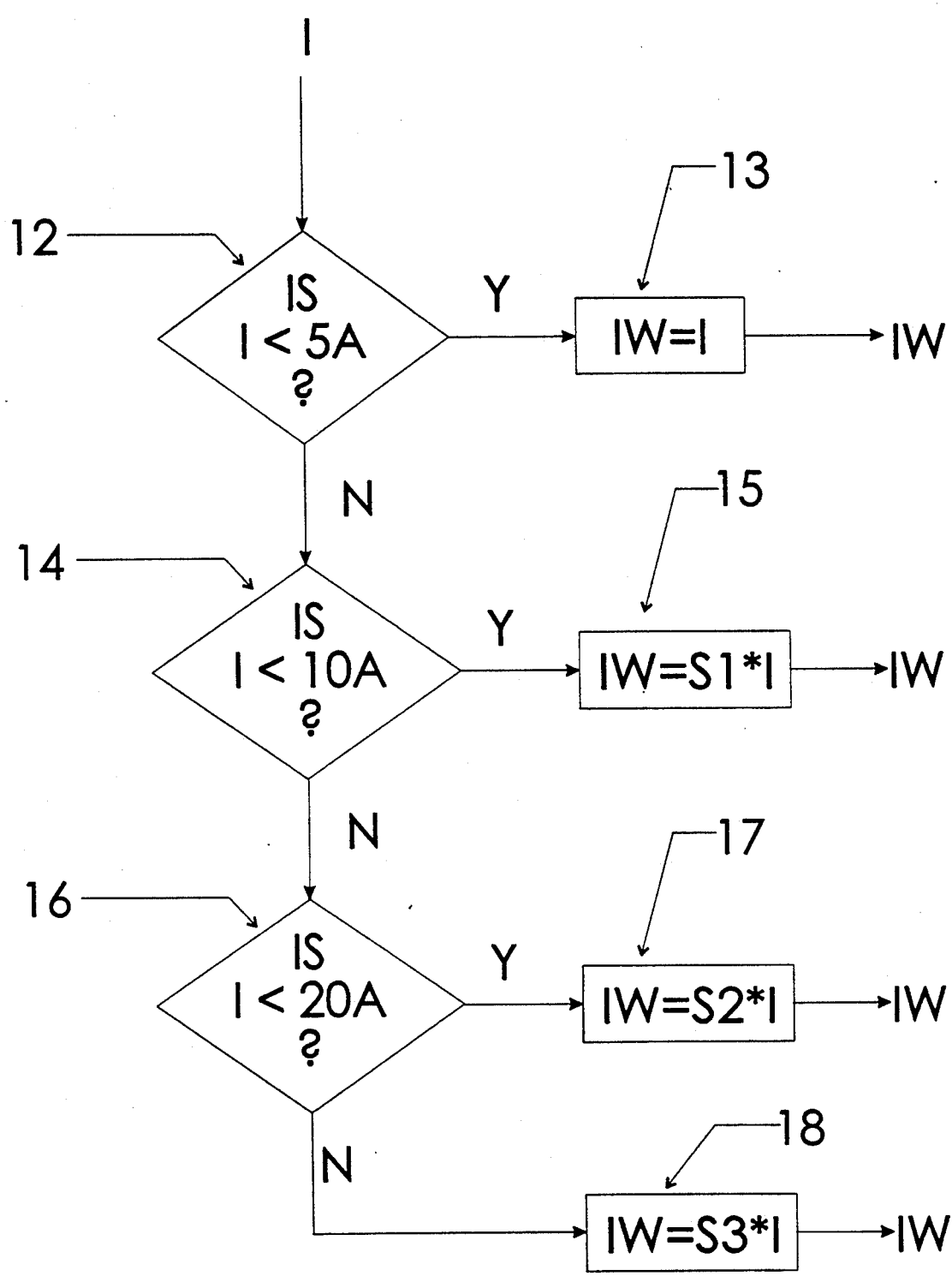
FIG. 3 is a flowchart showing the operation of the Scaling Logic shown in FIG. 2.

Referring now to FIG. 3, details of the operation of the scaling logic previously described in prior FIG. 2 will be described. The known effect of higher reduced deep cycle battery capacities at higher current draws is accounted for in the scaling logic by weighting the instantaneous current values so that the higher the current draw, the proportionately greater its effective contribution to the accumulated energy signal, and therefore the proportionately lesser the remaining stored energy left, which is an equivalent accounting of the reduction to the original energy capacity of the battery. This effective weighting is accomplished by scaling the value of current drawn by scale factors increasingly greater than one for increasingly large current draws. The absolute magnitudes of the scale factors may vary with different deep cycle battery systems and can be provided by the battery manufacturer or determined by completely drawing down the battery system at varied current draws and noting the different capacities obtained. Generally it is noted in the art that the relative magnitudes of the scale factors will vary upwards from one for current draws less than about five amperes. In the preferred embodiment, the scale factors are applied to current draws greater than five amperes, between five and ten amperes, between ten and twenty amperes, and greater than twenty amperes. The digital signal I is input to decision block 12. If the current I is less than five amperes, the effective weighted current IW is set equal to the current signal I and IW is output by scaling block 13. On the other hand, if the current I is not less than five amperes, the current signal I is applied to decision block 14. If the current I is less than ten amperes, the effective weighted current IW is set equal to the current signal 1 scaled by the scale factor S1 such that IW=S1 * I and IW is output by the scaling block 15. If the current I is not less than ten amperes, the current signal 1 is applied to decision block 16. If the current I is less than twenty amperes, the effective weighted current IW is set equal to the current signal I scaled by the scale factor S2 such that IW=S2 * I and IW is output by the scaling block 17. If the current 1 is not less than twenty amperes, then the effective weighted current IW is set equal to the current signal I scaled by the scale factor S3 such that IW=S3 * I and IW is output by the scaling block 18. In variations on the ranges illustrated in the preferred embodiment, more current ranges and scale factors could be used to implement the same scaling with higher resolution. These and other possible variations implementing the functionality described herein are properly considered to be within the scope and spirit of the claims to be presented.

Figure 4:
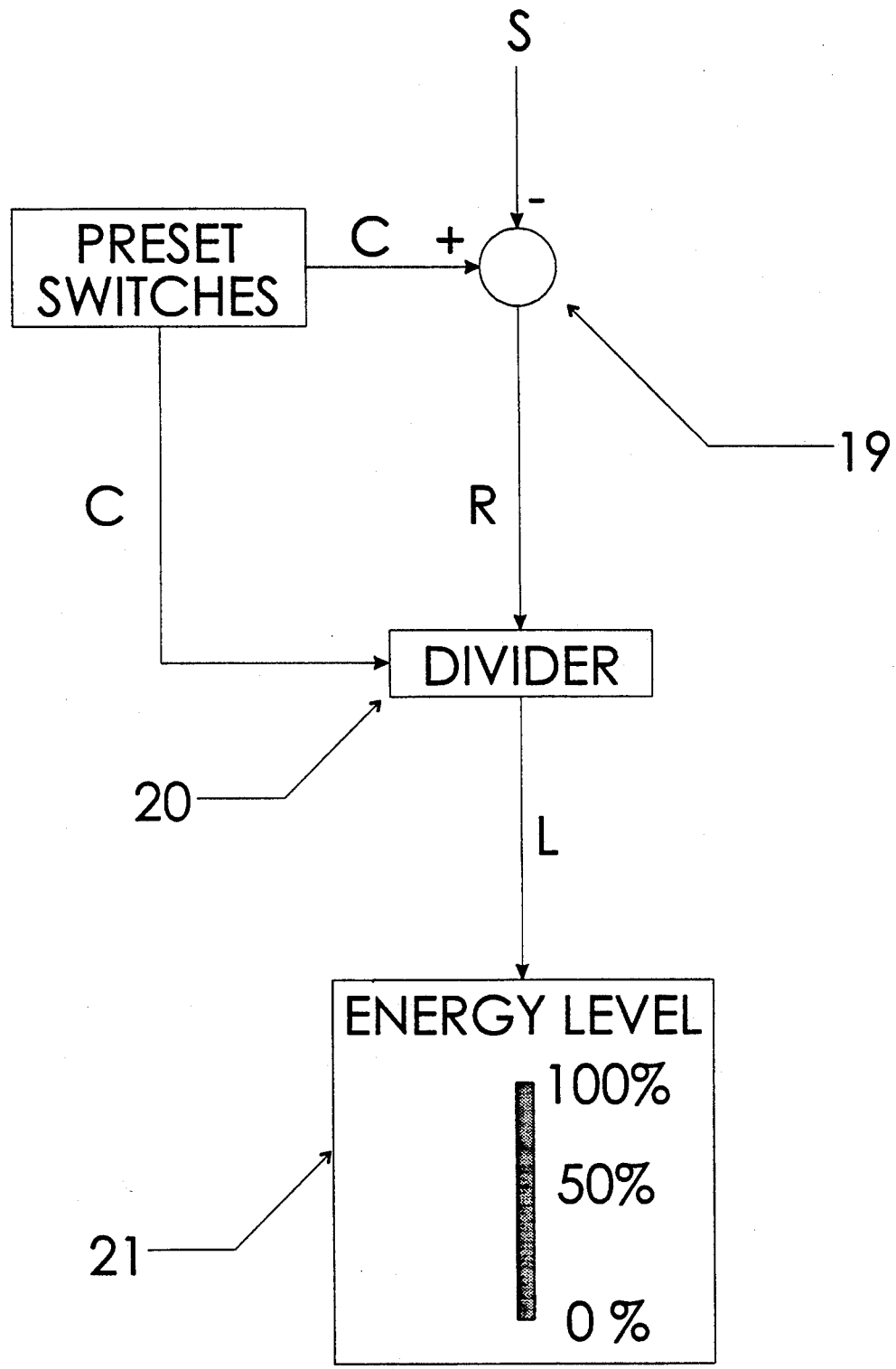
FIG. 4 is a block diagram of the Energy Level Computer shown in FIG. 2.

Referring now to FIG. 4, details of the operation of the Energy Level Computer previously shown in prior FIG. 2 will be described. As previously described, accumulating over time the effective weighted current signal yields a summed energy quantity which has depleted the effective energy capacity of the battery. The summed energy signal S is applied to summer 19 where it is subtracted from the original amp-hour capacity signal of the battery C to provide the remaining stored energy signal R. In the preferred embodiment, the digital capacity signal C is provided to the summer 19 by means of preset switches such as commercially available thumbwheel or DIP address switches, preferably located on or within the central panel of the device. Other means of providing the digital capacity signal C could be utilized, such as reading a memory buffer whose contents were programmed by a Programmable Read Only Memory (PROM) or Erasable Programmable Read Only Memory (EPROM). These and other possible variations implementing the functionality described herein are properly considered to be within the scope and spirit of the claims to be presented. Returning to FIG. 4, the remaining stored energy signal R output from the summer 19 is then applied to divider 20 where it is divided by the energy capacity signal C and the quotient L is output. The said output is thus computed as L=R/C and represents the remaining stored energy level as a percentage or fraction of battery capacity. The energy level signal L is then applied to display 21, which in the preferred embodiment may be an LED (light emitting diode) bar graph display, segmented LCD (liquid crystal display), array of LED's, or the like. These and other possible variations implementing the functionality described herein are properly considered to be within the scope and spirit of the claims to be presented.

Having described the invention in detail and by way of reference to preferred embodiments thereof, it will be apparent that other modifications and variations are possible without departing from the scope and spirit of the invention. Accordingly, it is to be understood that the invention is not to be limited by the specific illustrative embodiments, but only by the scope of the appended claims.

What is claimed is:

1. An energy instrumentation and monitoring system for the on board cabin battery system of a recreational vehicle, marine vessel or a vehicle, the system comprising:

a means coupled to said cabin battery system to generate a current flow signal responsive to the charge or discharge current of said cabin battery system;

a means to generate an energy depletion signal responsive to integration over time of said current flow signal;

a means to generate a stored energy signal responsive to the the differential of the total energy capacity of said cabin battery system and said energy depletion on signal;

a means to generate an energy level signal responsive to the ratio of said stored energy signal to the total energy capacity of said battery system;

a means to display said energy level signal responsive.

2. The system as in claim 1, further comprising:

a means of displaying the magnitude and direction of said charge or discharge current.

3. An energy instrumentation and monitoring system for the on board cabin battery system of a recreational vehicle, marine vessel or a vehicle, the system comprising:

a means to generate a signal responsive to the net current flow into or out of said battery system;

a means to generate a weighted signal responsive to the magnitude of said net current signal;

a means to generate a summed energy signal responsive to the accumulation over time of said weighted signals;

a means to store a signal indicative of the initial capacity of said battery system;

a means to generate a remaining stored energy signal responsive to the differential of said initial capacity signal and said summed energy signal;

a means to generate a proportionate energy level signal responsive to the ratio of said remaining stored energy to the total energy capacity of said battery system.

4. The system as in claim 3, further comprising;

a displaying means of indicating both the direction and magnitude of said net current flow with units of amperes indicated thereon.

5. The system as in claim 3, further comprising;

a means to clear the accumulation of said weighted signals and reset to zero said summed energy signal; a means to modify said stored initial capacity signal.

6. An energy instrumentation and monitoring system for the on board cabin battery system of a recreational vehicle, marine vessel or a vehicle, the system comprising:

a resistive network in electrical series between said battery system and an electrical distribution panel of the loads and charging currents of said recreational vehicle;

a circuit whose input is in electrical communication with said resistive network and whose output is a first signal responsive to the magnitude and direction of the current flowing through said resistive network;

a means for generating a second signal whose magnitude is scaled increasingly greater than unity in accordance with increasing magnitude of said first signal;

an accumulation means generating a third accumulated signal responsive to the sum over time of said second signals;

a storage means for holding a fourth signal indicative of the initial capacity of said battery system;

a means for generating a fifth differential signal between said fourth stored capacity signal and said third accumulated signal;

a means for generating a sixth ratiometric signal responsive to the ratio of said fifth differential signal to said fourth stored capacity signal;

a displaying means with indicia thereon for indicating said sixth ratiometric signal.

7. The system as in claim 3, further comprising;
a switching means enabling the clearing of said third accumulated signal to zero;
a programmable switching means to change the contents of said initial capacity signal.

8. The system as in claim 3, further comprising;
a means for scaling the magnitude of said second signal when said first signal has a polarity corresponding to battery charging current, said scaling being preferentially equal to unity;
a means for scaling the magnitude of said second signal when said first signal has a polarity corresponding to battery draining current, said signal scaling being increasingly greater than unity in accordance with increasing magnitude of said second signal.

9. The system as in claim 8, further comprising;
a means for scaling the magnitude of said second signal when said first signal has a polarity corresponding to battery draining current, said signal scaling being preferentially equal to unity when said first signal is indicative of said draining current less than five amperes;
a means for scaling said second signal when said first signal has a polarity corresponding to battery draining current, said signal scaling being increasingly greater than unity when said first signal is indicative of draining current greater than five amperes; said increase in said signal scaling being responsive to increasing magnitude of said first signal.

* * * * *

UNITED STATES PATENT AND TRADEMARK OFFICE
CERTIFICATE OF CORRECTION

PATENT NO. : 5,315,287
DATED : May 24, 1994
INVENTOR(S) : David Sol

It is certified that error appears in the above-indentified patent and that said Letters Patent is hereby corrected as shown below:

Column 9, line 1, claim 7, delete 3 and insert -- 6

Column 9, line 1, claim 8, delete 3 and insert -- 6

Signed and Sealed this

Sixteenth Day of August, 1994

*Attest:*

BRUCE LEHMAN

*Attesting Officer*    *Commissioner of Patents and Trademarks*